United States Patent
Yokoyama et al.

(10) Patent No.: US 6,455,629 B1
(45) Date of Patent: Sep. 24, 2002

(54) AQUEOUS MATTE COATING COMPOSITION

(75) Inventors: Tetsuya Yokoyama; Masahiro Kondo, both of Kanagawa-ken; Hiromi Harakawa; Kenji Aoki, both of Hiratsuka, all of (JP)

(73) Assignee: Kansai Paint Co., Ltd. (JP)

( * ) Notice: Subject to any disclaimer, the term of this patent is extended or adjusted under 35 U.S.C. 154(b) by 0 days.

(21) Appl. No.: 09/305,740

(22) Filed: May 6, 1999

(30) Foreign Application Priority Data

May 6, 1998 (JP) .......................................... 10/123457

(51) Int. Cl.$^7$ .............................................. C08L 61/00
(52) U.S. Cl. ...................... 524/512; 524/261; 524/502; 524/588; 524/730
(58) Field of Search ................................ 524/261, 512, 524/502, 730, 588

(56) References Cited

U.S. PATENT DOCUMENTS

| | | | | |
|---|---|---|---|---|
| 4,351,910 A | * | 9/1982 | Sugitani et al. ................ 521/56 |
| 4,451,602 A | * | 5/1984 | Furukawa et al. ........... 524/266 |
| 4,506,052 A | * | 3/1985 | Furukawa et al. ........... 524/357 |
| 4,578,417 A | * | 3/1986 | Furukawa et al. ........... 524/378 |
| 4,880,861 A | * | 11/1989 | Matsumura et al. ......... 524/314 |
| 4,886,862 A | * | 12/1989 | Kuwamura et al. .......... 526/247 |
| 4,975,488 A | * | 12/1990 | Furukawa et al. ........... 525/100 |
| 4,980,409 A | * | 12/1990 | Harakawa et al. ........... 524/510 |
| 5,093,428 A | * | 3/1992 | Negishi et al. .............. 525/276 |
| 5,344,880 A | * | 9/1994 | Nambu et al. ............... 525/100 |
| 5,399,607 A | * | 3/1995 | Nanbu et al. ................ 524/385 |
| 5,639,825 A | * | 6/1997 | Nanbu et al. ................ 525/100 |
| 6,020,433 A | * | 2/2000 | Hirano et al ................ 525/217 |

FOREIGN PATENT DOCUMENTS

JP  24519/87  5/1987

* cited by examiner

*Primary Examiner*—Judy M. Reddick
(74) *Attorney, Agent, or Firm*—Fisher, Christen & Sabol

(57) ABSTRACT

An aqueous matte coating composition containing an aqueous dispersion (I) prepared by dispersing into water (B) a water-dispersible vinyl copolymer prepared by subjecting a monomer mixture of radically polymerizable unsaturated monomers including an unsaturated monomer having a polymerizable unsaturated double bond and an alkoxysilyl group in one molecule to radical polymerization in the presence of (A) a silicate compound consisting of organosilicate and/or its condensate, having an alkoxysilyl group, an acid value of 15 to 150 mg KOH/g and a hydroxyl value of 30 to 200 mg KOH/g, and including the silicate compound (A), and (C) a melamine resin not having complete compatibility with the vinyl copolymer (B).

18 Claims, No Drawings

AQUEOUS MATTE COATING COMPOSITION

BACKGROUND OF THE INVENTION (1) Field of the Invention

This invention relates to an aqueous matte coating composition.

(2) Description of the Background Art

An aqueous coating composition has widely been used, because it uses water as a medium and is free of troubles about working atmosphere, danger of fire, and so forth. However, recent diversification in user's need shows a tendency to lose interest in feeling of metallic luster and highly demands matte coating film which provides grave feeling.

Particularly, user's needs in recent years highly demand to provide an aqueous matte coating composition capable of forming a coating film showing difficulties in forming mars during transportation and showing high mar resistance.

Japanese Patent Publication No.24519/87 discloses a process for forming a matte coating film by use of an anionic electrodeposition coating composition comprising an alkoxysilyl group-containing vinyl copolymer as a base resin and an amino resin as a curing agent.

The aqueous matte coating composition used in the above process is such that the acrylic copolymer used as the base resin has alkoxysilyl group on its side chain and the alkoxysilyl group is gradually hydrolized on water solubilization or making water dispersion to form silanol, and further condensation between the silanols forms siloxane linkage, resulting in forming fine dispersion particles having an interparticle gel structure. As the result, when the fine dispersion particles are subjected to anionic electrodeposition coating, a film having a fine coarse surface is formed and even if heat-cured, the film keeps the coarse surface without forming a complete melt flow to form a good matte coating film, resulting in being widely used in the art.

However, use of the above aqueous matte coating composition makes it impossible to satisfy user's needs of providing a coating film having high mar resistance, too. On the one hand, attempts to improve the mar resistance have been made, for example, by heat curing the coating film at high temperatures. On the other hand, developments of materials capable of drastically improve mar resistance have been demanded from the standpoint of the coating composition.

SUMMARY OF THE INVENTION

It is an object of the present invention to provide an aqueous matte coating composition which is capable of forming a matte coating film by use of conventional coating methods.

It is another object of the present invention to provide an aqueous mar-resistant matte coating composition which is capable of showing good storage stability, and capable of forming a coating film showing improved properties in mar resistance and durability.

That is, the present invention in a first embodiment provides an aqueous matte coating composition containing an aqueous dispersion (I) prepared by dispersing into water (B) a water-dispersible vinyl copolymer prepared by subjecting a monomer mixture of radically polymerizable unsaturated monomers including an unsaturated monomer having a polymerizable unsaturated double bond and an alkoxysilyl group in one molecule to radical polymerization in the presence of (A) a silicate compound consisting of an organosilicate represented by the general formula (1):

where R is same or different and is hydrogen atom or a monovalent hydrocarbon group having 1 to 10 carton atoms, and/or its condensate, having an alkoxysilyl group, an acid value of 15 to 150 mg KOH/g and a hydroxyl value of 30 to 200 mg KOH/g, and including the silicate compound (A), and (C) a melamine resin not having complete compatibility with the vinyl copolymer (B).

The present invention in a second embodiment provides an aqueous matte coating composition containing an aqueous dispersion (II) prepared by dispersing into water (A) a silicate compound as claimed in claim 1, (D) a water-dispersible vinyl copolymer having an alkoxysilyl group, an acid value of 15 to 150 mg KOH/g and a hydroxyl value of 30 to 200 mg KOH/g, and (C) a melamine resin not having complete compatibility with the vinyl copolymer (D).

DETAILED DESCRIPTION OF THE INVENTION

The silicate compound (A) used in the first and second embodiments of the present invention includes ones represented by the above general formula (1), in which R is same or different and is hydrogen atom or a monovalent hydrocarbon group having 1 to 10 carbon atoms and its condensates. Use of such an organosilicate as to have a carbon number more than 10 in R results in reducing a speed of hydrolysis and in making poor the pollution resistance and durability of the film.

Examples of the monovalent hydrocarbon group having 1 to 10 carbon atoms in the above general formula may include alkyl group, aryl group and the like.

The above "alkyl group" may include straight-chain ones and branched ones, for example, methyl, ethyl, n-propyl, iso-propyl, n-butyl, iso-butyl, tert-butyl, n-pentyl, iso-pentyl, neopentyl, n-hexyl, iso-hexyl, n-octyl and the like. Of these, lower alkyl groups having 1 to 4 carbon atoms are preferred. The "aryl group" may include monocyclic and polycyclic ones, for example, phenyl group, toluyl group, xylyl group, naphtyl group and the like, phenyl group being preferred.

Preferable examples of the organosilicate used in the present invention may include tetrahydroxysilane, tetramethoxysilane, tetraethoxysilane, tetrapropoxysilane, tetrabutoxysilane, tetraphenoxysilane, dimethoxydiethoxysilane and the like. These may be used alone or in combination.

The condensate of organosilicate may include branched or straight-chain condensates between organosilicates represented by the above generai formula (1) and preferably includes condensates having a degree of condensation of 2 to 100 and represented by the general formula (2).

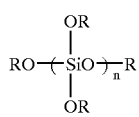
(2)

where R is defined as above, n is an integer of 2 to 100, preferably 2–8.

In the above general formula, when n is more than 100, effect of pollution resistance is undesirably reduced.

The organosilicate used in the present invention may preferably include such ones that R in the general formula is a lower alkyl group having 1 to 4 carbon atoms, and the condensate thereof may particularly include such ones that R in the general formula is a lower alkyl group having 1 to 4 carbon atoms and that the degree of condensation is in the range of 2 to 15 preferably 2–8.

The first embodiment of the present invention is explained more in detail hereinafter.

The aqueous matte coating composition in the first embodiment of the present invention consists of an aqueous dispersion (I) containing a water-dispersible vinyl copolymer (B) and a melamine resin (C). The aqueous dispersion (I) is prepared by a process which comprises subjecting a monomer mixture of radically polymerizable unsaturated monomers including an unsaturated monomer having a polymerizable unsaturated double bond and an alkoxysilyl group in one molecule to radical polymerization in the presence of the silicate compound (A) to prepare a water-dispersible vinyl copolymer (B) having an alkoxysilyl group, an acid value of 15 to 150 mg KOH/g and a hydroxyl value of 30 to 200 mg KOH/g, and including the silicate compound (A), followed by adding (C) a melamine resin not having complete compatibility with the vinyl copolymer (B) prior to or after adding a neutralizing agent, adding a neutralizing agent if no neutralizing agent is previously added, and by dispersing into water.

An advantageous process for preparing the water-dispersible vinyl copolymer (B) having alkoxysilyl group is a method of copolymerizing a monomer mixture of an alkoxysilyl group-containing unsaturated monomer with other monomers. The above monomer mixture may include (1) an unsaturated monomer having a polymerizable unsaturated double bond and an alkoxysilyl group in one molecule, (2) α, β-ethylenically unsaturated carboxylic acid, (3) a hydroxyl group-containing acrylic monomer, and (4) a radically polymerizable unsaturated monomer other than the above monomers (1), (2) and (3).

The unsaturated monomer (1) having the polymerizable unsaturated double bond and alkoxysilyl group is a monomer component by which the alkoxysilyl group is introduced into the copolymer, includes, for example, unsaturated di- or trialkoxy (or alkoxyalkoxy) silane compounds such as divinyl dimethoxysilane $(CH_2=CH)_2Si(OCH_3)_2$, divinyl di-β-methoxyethoxysilane $(CH_2=CH)_2Si(OCH_2CH_2OCH_3)_2$, vinyltrimethoxysilane $CH_2=CHSi(OCH_3)_3$, vinyltriethoxysilane $CH_2=CHSi(OC_2H_5)_3$, vinyltris-β-methoxyethoxysilane $CH_2=CHSi(OCH_2CH_2OCH_3)_3$, γ-methacryloxypropyltrimethoxysilane, γ-methacryloxypropyltriethoxysilane,

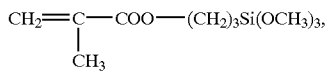

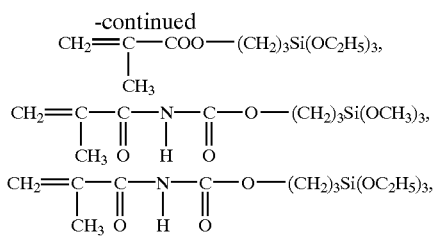

and the like. Of these, unsaturated trialkoxysilane compounds are preferred. This monomer may be used alone or in combination.

The alkoxysilane compound as the monomer component (1) is used in an amount of 0.1 to 10%, preferably 0.5 to 7% on the basis of a total weight (hereinafter on the same basis) of all the monomers. When the copolymer is water-dispersed, the alkoxysilyl group causes to form a polysiloxane linkage, resulting in increasing the molecular weight of the vinyl copolymer. When an amount of the alkoxysilane compound used is less than 0.1%, the above increase in molecular weight is not achieved with the result that a matte coating film having a low specular gloss is not obtained. On the other hand, when more than 10%, size of dispersed particles is so increased that sedimentation of the dispersed particles takes place and a non-uniform film is formed.

Examples of the α,β-ethylenically unsaturated carboxylic acid as the monomer component (2) include acrylic acid, methacrylic acid, maleic acid, maleic anhydride, fumaric acid, crotonic acid, itaconic acid, and the like. By use of the monomer component (2), carboxyl group is introduced into the vinyl copolymer, resulting in that the copolymer is water-dispersed by neutralization. The monomer component (2) may be used alone or in combination.

The α,β-ethylenically unsaturated carboxylic acid may be used in such an amount that the copolymer has an acid value of 15 to 150, preferably 20 to 100. When the acid value of the copolymer is less than 15, there is a tendency to make it difficult to form an aqueous dispersion. On the other hand, when the acid value is more than 150, water resistance of the film obtained may be reduced.

Examples of the hydroxyl group-containing acrylic monomer as the monomer component (3) include 2-hydroxyethyl acrylate, hydroxypropyl acrylate, 2-hydroxyethyl methacrylate, hydroxypropyl methacrylate and the like. By use of the above monomer, hydroxyl group is introduced into the acrylic copolymer to react with melamine resin for crosslinking reaction. The above monomer may be used alone or in combination.

The hydroxyl group-containing acrylic monomer is used in such an amount that the hydroxyl value is 30 to 200, preferably 50 to 150. When the hydroxyl value of the copolymer is less than 30, it shows poor film performance. On the other hand, when the hydroxyl value is more than 200, the film shows poor water resistance.

Other radically polymerizable unsaturated monomer as the monomer component (4) is a remaining component among monomer components for the vinyl copolymer, and may include known monomers usually used for the synthesis of vinyl copolymer, for example, $C_{1-10}$ alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate and the like; vinyl aromatic monomer such as styrene, α-methylstyrene, vinyltoluene and the like; amide compounds of acrylic acid or methacrylic acid; acrylonitrile, methacrylonitrile, and the like. The above unsaturated monomer may be selected depending on the intended physical properties, and may be used alone or in combination.

Copolymerization of the above unsaturated monomers (1) to (4) may be carried out according to the known processes per se for the preparation of vinyl copolymer, for example, by use of solution polymerization process, emulsion polymerization process, suspension polymerization process, and the like. Advantageously, it is preferred to carry out according to the solution polymerization process, and it may be carried out by reacting the above four monomer components for about 1 to about 20 hours, preferably about 4 to about 10 hours at a reaction temperature of normally about 0° C. to about 180° C., preferably about 40° C. to about 170° C. in the presence of a polymerization catalyst in a suitable inactive solvent.

As the above solvent, it is desirable to use a solvent which is capable of dissolving the copolymer being produced and is miscible with water so that gelation may not take place during copolymerization reaction. Examples of such a solvent used may include cellosolve solvent, carbitol solvent, glyme solvent, cellosolve acetate solvent, alcoholic solvent and the like.

Examples of the polymerization catalyst used include azo compounds, peroxide compounds, sulfides, sulfines, diazo compounds, nitroso compounds and the like.

In addition to the above processes, the vinyl copolymer having alkoxysilyl group on its side chain may also be prepared by addition reaction of an epoxysilane compound such as γ-glycidoxypropyltrimethoxysilane or of an isocyanatosilane compound such as γ-isocyanatopropyltriethoxysilane to a vinyl copolymer synthesized beforehand and having carboxy group and hydroxyl group.

The vinyl copolymer (B) thus obtained has an acid value of 15 to 150 mg KOH/g, a hydroxyl value of 30 to 200 mg KOH/g and a number average molecular weight of about 10,000 to 100,000, preferably about 20,000 to about 60,000. When the number average molecular weight is less than 10,000, the film formed may not show satisfactory durability. On the other hand, when the number average molecular weight is more than 100,000, viscosity of the resin is so increased that formation of uniform fine particles is made difficult on being water-dispersed.

Formation of an aqueous dispersion of the vinyl copolymer (B) may be effected by the conventional method, for example, by neutralizing a vinyl copolymer containing alkoxysilyl group, hydroxyl group and carboxyl group as above obtained with amine compounds, for example, aliphatic amines such as monoethylamine, diethylamine, triethylamine and the like, alkanol amines such as diethanolamine, triethanolamine and the like, cyclic amines such as pyridine, piperidine and the like, and ammonia in an amount of 0.5 to 1.0 equivalent relative to the carboxyl group.

The melamine resin (C) used as a crosslinking agent for the water dispersible vinyl copolymer (B) in the present invention is required to be compatible by the aid of a solvent common to both, but not to have complete compatibility in the absence of any solvent, with the vinyl copolymer (B). It may be defined hereinbelow that the melamine resin does not have complete compatibility with the vinyl copolymer (B).

The vinyl copolymer (B) is formulated with melamine resin (C) in a solids weight ratio of (B)/(C) to be 40/60, an amine compound is then added in an amount of 1.0 equivalent relative to carboxyl group of the vinyl copolymer (B), and water is then added to form an aqueous dispersion having a solid content of 20% by weight. The aqueous dispersion is coated onto a transparent glass plate to a thickness of 10 μm as a dry film, followed by removing the solvent by evaporation at room temperature to 100°C., and further by drying at a temperature of 150° C. to 200° C. for 5 to 10 minutes. When the film thus formed is found hazy by the naked eye, it is defined that the melamine resin (C) does not have complete compatibility with the vinyl copolymer (B). Further, quantitatively speaking, it may be defined that the melamine resin (C) does not have complete compatibility with the vinyl copolymer (B) when a percentage transmittance measured on the film obtained as above at a wavelength of 4000 Å by use of a spectrophotometer is 95% or less.

The melamine resin (C) used in the present invention has the percentage transmittance of 95% or less, preferably 90% to 50%, and has a weight average molecular weight of 400 to 4000, preferably 600 to 2500. The weight average molecular weight of the melamine resin represents one calculated in terms of polystyrene in gel permeation chromatography.

When the percentage transmittance is more than 95%, compatibility of the melamine resin with the vinyl copolymer is so increased that it is made impossible to form a matte film having a gloss of 50 or less (i.e. 60° specular reflection, and so forth).

The melamine resin (C) used in the present invention is not specifically limited so long as the above percentage transmittance is satisfied, and may be used in the form of various etherified ones such as ones modified by use of at least one of methyl alcohol, ethyl alcohol, isopropyl alcohol, n-butyl alcohol, isobutyl alcohol, octyl alcohol, 2-ethylhexyl alcohol, benzyl alcohol and the like. Those modified with alcohols having preferably $C_3$ or higher, more preferably $C_4$ to $C_{10}$ are preferred in the present invention. It is advantageous that the melamine resin contains an ether group modified by $C_3$ or higher alcohol in an amount of, on the average, at least one, preferably 2 to 4 per one nucleus of triazine ring.

Mixing amounts of respective components (A), (B) and (C) are explained hereinafter.

A mixing ratio of the vinyl copolymer (B) to the melamine resin (C) are such that (B)/(C) is in the range of 95/5 to 30/70, preferably 90/10 to 40/60 based on the weight of solid contents.

A mixing amount of the silicate compound (A) is such that a mixing ratio of the silicate compound (A) to a total amount of the vinyl copolymer (B) and the melamine resin (C) is in the range of 5:95 to 70:30, preferably 10:90 to 50:50 on the basis of the weight of solid contents.

The aqueous matte coating composition in the second embodiment of the present invention consists of an aqueous dispersion (II) containing the silicate compound (A), a water-dispersible vinyl copolymer (D) and the melamine resin (C). The aqueous dispersion (II) is prepared by a process which comprises adding the silicate compound (A) and the melamine resin (C) not having complete compatibility with the vinyl copolymer (D) prior to or after adding a neutralizing agent, followed by adding a neutralizing agent if no neutralizing agent has been added, and by dispersing into water.

The vinyl copolymer (D) may be prepared by subjecting a monomer mixture of the above monomers (1) to (4) to radical polymerization in the same manner as in the first embodiment of the present invention, except that the radical polymerization is carried out in the absence of the silicate compound (A).

The vinyl copolymer (D) has an acid value of 15 to 150 mg KOH/g, a hydroxyl value of 30 to 200 mg KOH/g, and a number average molecular weight in the range of about 10,000 to 100,000, preferably about 20,000 to about 60,000. When the number average molecular weight is less than 10,000, the film formed may tnot show satisfactory durability. On the other hand, when the number average molecular weight is more than 100,000, viscosity of the resin is so increased that formation of uniform fine particles is made difficult on being water-dispersed.

The silicate compound (A) and the melamine resin (C) used in the second embodiment of the present invention are the same as those used in the first embodiment of the present invention.

A mixing ratio of the vinyl copolymer (D) to the melamine resin (C) is in the range of 95/5 to 30/70, preferably 90/10 to 40/60 in terms of the weight of the solid content.

A mixing amount of the silicate compound (A) is such that a mixing ratio of the silicate compound (A) to a total amount of the vinyl copolymer (D) and the melamine resin (C) is in the range of 5/95 to 70/30, preferably 10/90 to 50/50.

As required, pigments, dyes and additives may be added to the aqueous matte coating composition of the present invention.

The aqueous matte coating composition of the present invention may be coated onto various kinds of metal materials such as aluminum, aluminum alloy, anodized aluminum, steel; a steel sheet plated with zinc, tin, chromium, aluminum and the like; a steel sheet subjected to a chemical treatment with chromic acid or phosphoric acid, or to a cathodic electrochemical treatment; and the like. Further, the aqueous matte coating composition may be coated directly onto the metal material, or, as a topcoating, onto a film formed by coating the known undercoating and intermediate coating.

The aqueous matte coating composition of the present invention may be coated onto the surface of the above metal material by means of, for example, spray coating, electrostatic spray.coating, brushing, dip coating, roll coating, electrodeposition coating and the like. The coated film thickness is normally about 5 to 100 μm, preferably about 10 to 80 μm. After coating, curing at about 100to 200° C. for about 10 to 60 minutes forms a matte film.

When the electrodeposition coating is employed as the coating method, it is usually carried out under the conditions of a coating bath temperature of 15 to 35° C., a coating voltage of 80 to 350 V and a treating time of 1 to 5 minutes. After the completion of the electrodeposition coating, without needing a step of washing with water, heat-curing forms an intended matte film.

The effects of the present invention are explained below.

It is guessed from the following reasons that the aqueous matte coating composition of the present invention is capble of forming a matte film showing high mar resistance by means of any known coating methods other than the electrodeposition coating, too.

An irregular reflection on the surface due to the formation of roughness on the surface of the film is essentially necessary for the formation of a matte film, no matter what coating method may be used, either the electrodeposition coating method or other coating methods, and further, in the case of a clear film, an irregular reflection within the film layer also acts supplementally thereto to lower its gloss.

The use of the aqueous matte coating composition of the present invention results in forming a matte film in that the incomplet compatibility of the melamine resin with the vinyl copolymer causes to produce a localization of the melamine resin within the film layer, resulting in producing irregular reflection within the film layer, and in that the formation of fine roughness due to the separation and localization of the vinyl copolymer and the melamine resin in the surface area of the film is fixed by the melt flow inhabitation caused by the formation of gel particles due to the alkoxysilyl group when heat cured.

On the other hand, high crosslink density of the coating film due to the presence of the organosilicate and migration of the organosilicate to the surface layer of the coating film may cause to increase hardness on the surface of the coating film, resulting in providing improved film properties in mar resistance.

EXAMPLE

The present invention is explained more in detail by the following Examples and Comparative Examples, in which "part" and "%" are all by weight.

Preparation Example 1

Preparation of Vinyl Copolymer (B) having Alkoxysilyl Group and including Silicate Compound (A) (Preparation of Alkoxysilyl Group-containing Vinyl Copolymer (B) in the Presence of Silicate Compound (A)):

A reactor was charged with 50 parts of isopropyl alcohol and 10 parts of Methyl Silicate MKC MS 51 (Trade name of about 5 to 6 mer on an average condensate of tetramethyl silicate marketed by Mitsubishi Chemical Corporation, and so forth) keeping at 80° C., and a mixture of 5 parts of styrene, 41 parts of methylmethacrylate, 17 parts of n-butylacrylate, 7.5 parts of 2-ethylhexyl methacrylate, 13 parts of hydroxylethyl acrylate, 10 parts of N-methylol acrylamide butyl ether, 5.5 parts of acrylic acid, one part of γ-methacryloxypropyltrimethoxysilane and 1.0 part of azobisdimethylvaleronitrile was then dropped thereinto over 3 hours. After the completion of the dropping procedure, the temperature was kept as above for one hour, and a mixture of one part of azobisdimethylvaleron itrile and 20 parts of butylcellosolve was then dropped, followed by reacting at 85° C. for one hour.

After the completion of the reaction, the solid content is controlled to 56% by use of butylcellosolve to obtain a vinyl copolymer varnish (B-1) having a number average molecular weight of 50,000, an acid value of 42 mg KOH/g and a hydroxyl value of 62 mg KOH/g, and including 10 parts of the silicate compound.

Preparation Example 2

Procedures of Preparation Example 1 were duplicated except that 20 parts of Methyl Silicate MKC MS51 (same as above) was used to obtain a vinyl copolymer varnish (B-2) controlled at a solid content of 58%, having a number average molecular weight of 50,000, an acid value of 42 mg KOH/g and a hydroxyl value of 62 mg KOH/g, and including 20 parts of the silicate compound.

Preparation Example 3

Preparation of Vinyl Copolymer (D) having Alkoxysilyl Group:

A reactor was charged with 50 parts of isopropyl alcohol keeping at 80° C., and a mixture of 5 parts of styrene, 43.5 parts of methylmethacrylate, 14.1 parts of n-butylacrylate, 7.5 parts of 2-ethylhexyl methacrylate, 13 parts of hydroxyethyl acrylate, 10 parts of N-methylol acrylamide butyl ether, 5.5 parts of acrylic acid, 1.4 parts of γ-methacryloxypropyltrimethoxysilane and 1.0 part of azobisdimethylvaleronitrile was then dropped thereinto over 4 hours. After the completion of the dropping procedure, the temperature was kept as above for one hour, and a mixture of one part of azobisdimethylvaleronitrile and 13 parts of butylcellosolve was then dropped, followed by reacting at 85° C. for 2 hours.

After the completion of the reaction, the solid content is controlled to 53% by use of butylcellosolve to obtain a vinyl copolymer varnish (D) having a number average molecular weight of about 50,000 an acid value of 42 mg KOH/g and a hydroxyl value of 62 mg KOH/g.

Preparation Example 4
Preparation of Melamine Resin (C):

A reactor was charged with 390 parts (one mole) of hexamethylolmelamine hexamethylether containing about 60% of the mononuclear compound, 592 parts (8 moles) of n-butanol and 2 parts of 75% sulfuric acid, followed by heating and reacting at 55° C. for 3 hours under vacuum. After the completion of the reaction, an aqueous caustic soda solution was added to be neutralized and filtered. The filtrate was thicknened under vacuum at a bath temperature of 70° C. or lower. The concentrate thus obtained is a transparent viscous liquid, and has such a structure as to have 2.8 of methyl group and 3.0 of butyl group per one of the melamine nucleus as the result of analysis by phosphoric acid decomposition gas chromatography. As the result of the analysis by the gel permeation chromatography, a content of the mononuclear compound is 57%.

Example 1

A uniform mixture of 132 parts of the vinyl copolymer varnish (B-1) including 10 parts of the silicate compound and obtained in Preparation Example 1, triethylamine in an amount of 0.8 equivalent to the carboxyl group in the copolymer and 30 parts of the melamine resin (C) prepared in Preparation Example 4 was formed. Deionized water is added to the above mixture so that the solid content may be 12% to obtain an aqueous matte coating composition for use in the electrodeposition coating. The aforementioned percentage transmittance in this case was 80%.

The electrodeposition coating composition thus obtained was charged in an electrodeposition coating bath and was coated onto an anodized aluminum alloy plate as an anode by carrying out the electrodeposition coating under such conditions that electricity was applied thereto for 3 minutes at a bath temperature of 22° C. under such a voltage that a cured film thickness may be 10 μm to obtain a coated plate. After the completion of the electrodeposition coating, the coated plate was washed with water, and heat cured at 180° C., for 30 minutes to obtain an electrodeposition coating film.

The performance test results of the film thus obtained is shown in the following Table-1 along with those in other Examples and Comparative Examples.

Example 2

The procedures of Example 1 were repeated except that the vinyl copolymer varnish (B-2) including 20 parts of the silicate compound was used in place of the vinyl copolymer varnish (H-1) including 10 parts of the silicate compound to obtain an electrodeposition coating film. The aforementioned percentage transmittance in this case was 75%.

Example 3

A uniform mixture of 132 parts of the vinyl copolymer (D) obtained in Preparation Example 3, triethylamine in an amount of 0.8 equivalent to the carboxyl group in the copolymer, 10 parts of Methyl Silicate MKC MS51 (same as above) and 30 parts of the melamine resin (C) prepared in Preparation Example 4 was formed. Deionized water was added to the above mixture so that the solid content may be 12% to obtain an aqueous matte coating composition for use in the electrodeposition coating. The aforementioned percentage transmittance in this case was 78%.

Example 4

Procedures of Example 3 were duplicated except that 20 parts of Methyl Silicate MKC MS51 (same as above) was used to obtain an electrodeposition coating film. The aforementioned percentage transmittance in this case was 72%.

Example 5

To the electrodeposition coating composition having a solid content of 12% and prepared in Example 1 was added deionized water in such an amount that viscosity may be controlled at 60 seconds at 20° C. by #4 Ford Cup, followed by spray coating so as to be a cured film thickness of 10 μm by use of a coating apparatus, W-71 IWATA, and heat-curing at 180° C. for 30 minutes. The aforementioned percentage transmittance for this case was 80%.

Comparative Example 1

Procedures of Example 3 were duplicated except that Methyl Silicate MKC MS51 (same as above) was not used to obtain an electrodeposition coating film. The aforementioned percentage transmittance for this case was 90%.

TABLE 1

|  | Examples | | | | | Comparative Example |
|---|---|---|---|---|---|---|
|  | 1 | 2 | 3 | 4 | 5 | 1 |
| Appearance of matte film | ○ | ○ | ○ | ○ | ○ | ○ |
| Specular reflection percentage | 20 | 10 | 7 | 5 | 23 | 20 |
| Degree of roughness of the film surface | 2.85 | 2.7 | 2.95 | 3.1 | 2.9 | 2.8 |
| Mar resistance | 4 | 4.5 | 3.5 | 4 | 4 | 1 |
| Adhesion properties | 100 | 100 | 100 | 100 | 100 | 100 |
| Alkali resistance properties | good | good | good | good | good | good |

Film Performance Test Methods
Appearance of Matte Film:
  Evaluation is visually carried out as follows.
  ○: Excellent in evenness and in soft feeling
  Δ: Poor in evenness and in soft feeling
Specular Reflection Percentage:
  Degree of gloss of the film is represented according to the 60° specular gloss defined in JIS K5400.
Degree of Roughness of the Film Surface:
  JIS B0601-1982 - - - 10 points average roughness (RZ) as μm is measured by use of SURFCOM 550A (Trade name of a surfacde gage marketed by Tokyo Seimitsu Co., Ltd.).
Mar Resistance (Scotch-Brite Rubbing Method):
  A Scotch-Brite (Trade name of mar resistance test instrument marketed by Sumitomo 3M Limited) is set at a fastness test machine, followed by effecting 10 reciprocating rubbings under a loading weight of 200 g to visually evaluate degree of formation of mars by grades in the range of 1 to 5 as follows.

5: Mars are scarcely formed; 3: mars are slightly formed; 1: mars are seriously formed.

Adhesion Properties:

On the coated surface is formed 100 of 1 mm square by use of a square cutter. An adhesive cellophane tape is adhered to the squares, followed by strongly peeling the tape to observe squares remaining without being peeled off.

Alkali Resistance Properties:

A sample is dipped in a 1% NaOH aqueous solution at 20° C. for 72 hours to observe blister, blushing, peeling, etc. of the film.

What is claimed is:

1. An aqueous matte coating composition containing an aqueous dispersion (I) prepared by dispersing into water (B) a water-dispersible vinyl copolymer prepared by subjecting a monomer mixture of radically polymerizable unsaturated monomers including an unsaturated monomer having a polymerizable unsaturated double bond and an alkoxysilyl group in one molecule and 2-ethylhexylmethacrylate to radical polymerization in the presence of (A) a silicate compound consisting of an organosilicate represented by formula (I):

where R is the same or different and is a hydrogen atom or a monovalent hydrocarbon group having 1 to 10 carbon atoms, and/or its condensate, having an alkoxysilyl group, an acid value of 15 to 150 mg KOH/g and a hydroxyl value of 30 to 200 mg KOH/g, and (C) a melamine resin not having complete compatibility with the vinyl copolymer (B), wherein a percentage transmittance of a cured film formed from the vinyl copolymer (B) and the melamine resin (C) is in the range of 95% or less.

2. An aqueous matte coating composition containing an aqueous dispersion (II) prepared by dispersing into water (A) a silicate compound consisting of an organosilicate represented by formula (I):

where R is the same or different and is a hydrogen atom or a monovalent hydrocarbon group having 1 to 10 carbon atoms, and/or its condensate, (D) a water dispersible vinyl copolymer prepared by subjecting a monomer mixture of radically polymerizable unsaturated monomers including an unsaturated monomer having a polymerizable unsaturated double bond and an alkoxysilyl group in one molecule and 2-ethylhexylmethacrylate to radical polymerization and having an alkoxysilyl group, an acid value of 15 to 150 mg KOH/g and a hydroxyl value of 30 to 200 mg KOH/g, and (C) a melamine resin not having complete compatibility with the vinyl copolymer (D), wherein a percentage transmittance of a cured film formed from the vinyl copolymer (D) and the melamine resin (C) is in the range of 95% or less.

3. A composition as claimed in claim 1, wherein the organosilicate is such that the monovalent hydrocarbon group is a lower alkyl group having 1 to 4 carbon atoms.

4. A composition as claimed in claim 1, wherein the condensate of the organosilicate is such that the monovalent hydrocarbon group is a lower alkyl group having 1 to 4 carbon atoms and the degree of condensation is in the range of 2 to 15.

5. A composition as claimed in claim 1, wherein the water-dispersible vinyl copolymer (B) is prepared by copolymerizing a monomer mixture of (1) an unsaturated monomer having a polymerizable unsaturated double bond and an alkoxysilyl group in one molecule, (2) α, β-ethylenically unsaturated carboxylic acid, (3) a hydroxyl group-containing acrylic monomer, and (4) 2-ethylhexylmethacrylate.

6. A composition as claimed in claim 2, wherein the water-dispersible vinyl copolymer (D) is prepared by copolymerizing a monomer mixture of (1) an unsaturated monomer having a polymerizable unsaturated double bond and an alkoxysilyl group in one molecule, (2) α,β-ethylenically unsaturated carboxylic acid, (3) a hydroxyl group-containing acrylic monomer, and (4) 2-ethylhexylmethacrylate.

7. A composition as claimed in claim 5 wherein the unsaturated monomer (1) is used in an amount of 0.1 to 10% on the basis of a total weight of the monomer mixture.

8. A composition as claimed in claim 1, wherein the vinyl copolymer (B) has a number average molecular weight of 10,000 to 100,000.

9. A composition as claimed in claim 2, wherein the vinyl copolymer (D) has a number average molecular weight of 10,000 to 100,000.

10. A composition as claimed in claim 1, wherein the melamine resin (C) includes a melamine resin which is modified with $C_4$ to $C_{10}$ alcohols.

11. A composition as claimed in claim 1, wherein a mixing ratio of the vinyl copolymer (B) to the melamine resin (C) is such that (B)/(C) is in the range of 95/5 to 30/70.

12. A composition as claimed in claim 2, wherein a mixing ratio of the vinyl copolymer (D) to the melamine resin (C) is such that (D)/(C) is in the range of 95/5 to 30/70.

13. A composition as claimed in claim 1, wherein a mixing amount of the silicate compound (A) is such that a mixing ratio of the silicate compound (A) to a total amount of the vinyl copolymer (B) and the melamine resin (C) is in the range of 5:95 to 70:30 on the basis of the weight of solid contents.

14. A composition as claimed in claim 2, wherein a mixing amount of the silicate compound (A) is such that a mixing ratio of the silicate compound (A) to a total amount of the vinyl copolymer (D) and the melamine resin (C) is in the range of 5:95 to 70:30 on the basis of the weight of solid contents.

15. A composition as claimed in claim 2, wherein the organosilicate is such that the monovalent hydrocarbon group is a lower alkyl group having 1 to 4 carbon atoms.

16. A composition as claimed in claim 2, wherein the condensate of the organosilicate is such that the monovalent hydrocarbon group is a lower alkyl group having 1 to 4 carbon atoms and the degree of condensation is in the range of 2 to 15.

17. A composition as claimed in claim 6, wherein the unsaturated monomer (1) is used in an amount of 0.1 to 10% on the basis of a total weight of the monomer mixture.

18. A composition as claimed in claim 2, wherein the melamine resin (C) includes a melamine resin which is modified with $C_4$ to $C_{10}$ alcohols.

* * * * *